United States Patent Office 3,280,176
Patented Oct. 18, 1966

3,280,176
ESTERIFICATION OF α,β-UNSATURATED CARBOXYLIC ACIDS WITH ALKYLENE OXIDES
Fritz Meier, Ludwigshafen (Rhine), and Nikolaus Von Kutepow, Karlsruhe-Rueppurr, Germany, assignors to Badische Anilin- & Soda-Fabrik Aktiengesellschaft, Ludwigshafen (Rhine), Germany
No Drawing. Filed Dec. 9, 1963, Ser. No. 329,225
Claims priority, application Germany, Dec. 12, 1962, B 69,946
4 Claims. (Cl. 260—486)

This invention relates to a process for the esterification of α,β-olefinically unsaturated carboxylic acids with alkylene oxides.

It is known that catalysts, such as sulfuric acid, ferric chloride or sodium acetate, are used in the esterification of saturated carboxylic acids with alkylene oxides.

If alkylene oxides are reacted with α,β-olefinically unsaturated carboxylic acids instead of with saturated carboxylic acids, the corresponding esters are obtained only in poor yields when working in the presence of the said catalysts. Tertiary amines, such as dimethylaniline, pyridine, quinoline and their derivates, have been described as catalysts for the esterification of α,β-olefinically unsaturated carboxylic acids, such as acrylic acid and methacrylic acid, with alkylene oxides. These catalysts have the disadvantage however that only relatively poor yields are obtained in spite of long reaction periods.

It is also known that the esterification of acrylic acid or methacrylic acid with alkylene oxides may be catalyzed by tertiary amines in the presence of a water-soluble inorganic nitrite acting as a polymerisation inhibitor. The addition of the water-soluble inorganic nitrite makes possible a higher reaction temperature and consequently a shortening of the reaction period. However in this method an aqueous solution of the nitrite must be added to the reaction medium or the nitrite must be suspended in the reaction mixture.

It is an object of this invention to provide a process for the esterification of α,β-olefinically unsaturated carboxylic acids with 1,2-alkylene oxides in which a substance is used which acts as an esterification catalyst and at the same time as a polymerization inhibitor. It is a further object of this invention to provide a catalyst by means of which the esterification may be carried out at lower reaction temperatures than in the prior art methods and yet at adequate reaction speed.

In accordance with this invention these objects are achieved and carboxylic esters having the general formula:

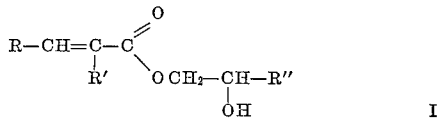

in which R is a hydrogen atom or alkyl, R' is a hydrogen atom or alkyl and R" is a hydrogen atom, alkyl or chloromethyl are obtained by reaction of α,β-olefinically unsaturated monocarboxylic acids having the general formula:

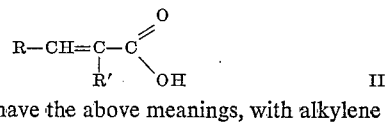

in which R and R' have the above meanings, with alkylene oxides having the general formula:

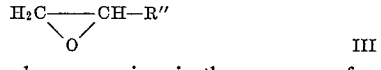

in which R" has the above meaning, in the presence of a carboxylic amide as esterification catalyst.

A particular advantage of the new process is that when using carboxylic amides as catalysts, it is not necessary to add any polymerisation inhibitor, as for example, the abovementioned inorganic nitrites, in suspension or in aqueous solution. The acid amides act at the same time as stabilizers for the readily polymerizable esters. Another advantage of the new process is that the esterification may be carried out at low reaction temperatures at a high reaction speed. This is of great advantage for the production of readily polymerizable esters of unsaturated carboxylic acids having free hydroxy groups since alkylene oxides tend to react with these free hydroxy groups. Finally the esterification of α,β-unsaturated carboxylic acids may also be carried out with alkylene oxides which have additional functional groups in the molecule.

Compounds having the general formula II in which the radicals R and R' denote hydrogen or alkyl having one to four carbon atoms are especially suitable as α,β-olefinically unsaturated monocarboxylic acids. In particular, acrylic acid, methacrylic acid or crotonic acid may be used.

1,2-alkylene oxides having the Formula III may be used as alkylene oxides in particular those in which R" denotes hydrogen, alkyl having 1 to 4 carbon atoms or chloromethyl. Examples of such 1,2-alkylene oxides are ethylene oxide, 2,1-propylene oxide, 1,2-butylene oxide or epichlorohydrin.

The reactants are in general used in equimolar amounts in the reaction; it may be advantageous however to use either the acid or the alkylene oxide in excess. The excess may amount for example to 1.1 to 2 moles.

Carboxylic amides which may be used as catalysts have the general formula:

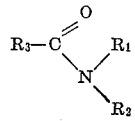

in which $R_1$ and $R_2$ each denotes a hydrogen atom or an alkyl group having one to four carbon atoms $R_1$ and $R_2$ may represent common members of a heterocyclic ring having 5 to 7 ring members and, apart from the carbonamide nitrogen atom, having hydrocarbon structure or containing one additional nitrogen or oxygen atom, $R_3$ denotes a hydrogen atom, an alkyl group having one to four carbon atoms or a —$N(R_2)_2$ group, and $R_1$ and $R_3$ together with the radical —CO—$NR_2$— may be members of a ring having five to seven members and having hydrocarbon structure apart from the grouping —CO—$NR_2$—. The following are examples of carboxylic amides which may be used as catalysts: N-Methylformamide, N,N-dimethylformamide, N,N-dibutylformamide, N,N-dimethylacetamide, N,N'-dimethylurea, N-formylpyrrolidine, N-formylmorpholine, N-formylpiperazine, pyrrolidone, N-methylpyrrolidone, and ε-caprolactam. N,N-dimethylformamide is particularly suitable. Mixtures of the said carboxylic amides may also be used as the catalyst.

The catalyst is advantageously used in a concentration of 0.1 to 5% by weight, preferably 0.2 to 2% by weight with reference to the carboxylic acid to be esterified. Larger amounts of catalyst may however be used and it then assumes at the same time the function of a solvent.

The most suitable reaction temperatures are between 70° and 120° C., preferably between about 80° and 100° C.

Esterification of the α,β-olefinically unsaturated carboxylic acids having the Formula II with the 1,2-alkylene oxides having the Formula III is usually carried out at atmospheric pressure. It is however possible to work at superatmospheric pressure, for example up to 20 atmospheres gauge. This is particularly recommended when a low boiling point epoxide or a solvent having a boiling point lower than the reaction temperature chosen is used.

The reaction may be carried out with or without solvents depending on the reactants and the reaction conditions. When using ethylene oxide it is recommendable to use a solvent.

Solvents when used are especially those which do not react with the acid or epoxide components under the reaction conditions. Examples of such inert solvents are aliphatic, aromatic or cycloaliphatic hydrocarbons, such as n-heptane, cyclohexane, benzene and petroleum ether, and also linear or cyclic ethers, such as diethyl ether, tetrahydrofuran, dioxane, halohydrocarbons, such as chloroform and carbon tetrachloride, ketones, such as acetone, carboxylic esters, as for example ethyl acetate, or also alkyl acrylates. They are generally used in amounts of 0.5 to 30% by weight with reference to carboxylic acid.

It is well known that the $\beta$-hydroxyalkyl esters of $\alpha,\beta$-unsaturated acids obtainable according to this invention are valuable intermediates for the production of homopolymers and copolymers which can be converted into high-grade plastics by reactions at their free hydroxyl groups.

The invention is further illustrated by the following examples. The parts specified in the examples are parts by weight.

EXAMPLE 1

50 parts of freshly distilled acrylic acid, 60 parts of benzene and, as catalyst, 2 parts of N,N-dimethylformamide are charged into an agitated autoclave. The reactor is cooled with carbon dioxide snow and then 31 parts of ethylene oxide is forced in. The closed autoclave is heated to 100° C., the pressure thus rising to about 2 atmospheres gauge. The reaction mixture is kept for another thirty minutes at this temperature with continuous agitation, the pressure no longer varying, and the whole is then allowed to cool. The benzene is first distilled off in a water jet pump vacuum (about 25 mm. Hg) from the pale brownish crude product and the remainder is fractionated in an oil pump vacuum. In addition to 4 parts of first runnings, 74 parts of glycol monoacrylate having a boiling point of 53° to 54° C. at 0.2 mm. Hg is obtained, i.e., a yield of 91.8% of the theory.

EXAMPLE 2

A mixture consisting of 60 parts of acrylic acid, 55 parts of propylene-(1,2) oxide, 3 parts of N,N-dimethylformamide and 55 parts of benzene is charged into an agitated autoclave and heated to 90° C. After this temperature has been reached, the whole is allowed to react for another thirty minutes with continued shaking, then cooled and the reaction product fractionated in vacuo. The solvent and low boiling point components distill off at up to 65° C. at 0.5 to 0.6 mm. Hg. 14 parts thereof is collected in the receiver and 52 parts in a trap cooled with solid carbon dioxide. The next fraction contains 96 parts of (2-hydroxy)-propyl acrylate having a boiling point of 64° to 67° C. at 0.2 mm. Hg. The yield is 88.5% of the theory with reference to the acrylic acid used.

EXAMPLE 3

361 parts of epichlorohydrin is added to a mixture, heated to 80° C., of 281 parts of acrylic acid and 5 parts of N,N-dimethylformamide, at such a rate that the temperature during the reaction does not rise above 90° C. The whole is then stirred for another hour at this temperature and the reaction product fractionated in an oil pump vacuum. A first runnings is separated at up to 80° C. at 0.3 mm. Hg, 100 parts being collected in the receiver and 52 parts in a trap cooled with solid carbon dioxide. 450 parts of (3-chloro-2-hydroxy)-propyl acrylate having a boiling point of 80° to 89° C. at 0.3 mm. Hg, equivalent to a yield of 70% of the theory, is obtained as the main fraction.

220 parts of acrylic acid and 5 parts of dimethylformamide are added to the 152 parts of first runnings obtained by the said reaction and consisting according to analysis of 61 parts of acrylic acid and 81 parts of epichlorohydrin. The mixture is heated to 80° C. and 280 parts of epichlorohydrin is added, the temperature again being kept between 80° and 90° C. By working up as described in the above examples, 144 parts of first runnings, 455 parts of (3-chloro-2-hydroxy)-propyl acrylate and 60 parts of a high boiling point residue are obtained. Since the first runnings may be used again, the total yield is 91% of the theory with reference to acrylic acid.

EXAMPLE 4

361 parts of epichlorohydrin is added to a mixture, heated to 100° C., of 281 parts of acrylic acid and 10 parts of formamide at such a rate that the temperature does not rise above 100° C. The reaction mixture is then kept at the said temperature for another hour while stirring. The product is fractionated in vacuo. 43 parts of first runnings is separated up to a temperature of 80° C. at 0.3 mm. Hg, and at the same time 10 parts of low boiling point constituents is condensed in the trap cooled with carbon dioxide snow. Then 430 parts of (3-chloro-2-hydroxy)-propyl acrylate passes over, equivalent to a yield of 67% of the theory.

EXAMPLE 5

A mixture consisting of 86 parts of crotonic acid, 58 parts of propylene oxide-(1,2), 3 parts of N,N-dimethylformamide and 47 parts of acetone is heated to 100° C. in an agitated alloy steel autoclave for thirty minutes. After cooling, the acetone is first distilled off from the reaction mixture at atmospheric pressure and then the remainder is fractionated in vacuo. 8 parts of first runnings passes over at up to 85° C. at a pressure of 1 mm. Hg and then at the same pressure 119.5 parts of 2-hydroxypropyl crotonate passes over at 85° to 89° C. This is a yield of 83% of the theory.

EXAMPLE 6

A mixture of 86 parts of methacrylic acid, 58 parts of propylene oxide-(1,2), 3 parts of N,N-dimethylacetamide and 47 parts of acetone is kept for thirty minutes at 100° C. in an agitated autoclave as described in Example 5. For working up the reaction product, the acetone is first distilled off at atmospheric pressure; by fractionation of the remainder 9 parts of first runnings is obtained at up to 74° C. and 1 mm. Hg and then 121 parts of 2-hydroxypropyl methacrylate is obtained at 74° to 79° C. and 1 mm. Hg. The yield is 84% of the theory.

EXAMPLE 7

60 parts of acrylic acid and 55 parts of propylene oxide-(1,2) are reacted in the presence of 3 parts of N,N-dimethylacetamide and 47 parts of acetone for thirty minutes at 90° C. in an agitated autoclave as in Example 5. By working up the product in the way described in Examples 5 and 6, after separating the solvent, 2 parts of first runnings is obtained up to 62° C. at 0.3 mm. Hg and then 95.2 parts of 2-hydroxypropyl acrylate is obtained as the main fraction at 64° to 67° C. at 0.2 mm. Hg. The yield is 88% of the theory with reference to acrylic acid used.

We claim:

1. A process for the production of carboxylic esters having the formula:

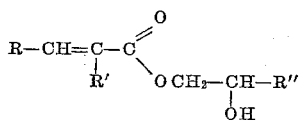

in which R and R' each denotes a member selected from the group consisting of hydrogen and alkyl and R'' denotes a member selected from the group consisting of hydrogen, alkyl and chloromethyl, which comprises reacting an α,β-olefinically unsaturated monocarboxylic acid having the formula:

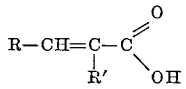

in which R and R' have the meanings given above, with an alkylene oxide having the formula:

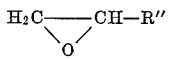

in which R'' has the meaning given above, in the presence of a carboxylic amide of the formula:

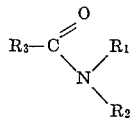

in which $R_1$ and $R_2$ each denotes a member selected from the group consisting of hydrogen and alkyl and in which $R_1$ and $R_2$ when taken together with the amide nitrogen atom to which they are attached form a ring having 5 to 7 ring members, the said ring being a member selected from the group consisting of a ring containing the amide nitrogen atom, a ring containing the amide nitrogen atom and one oxygen atom, and a ring containing the amide nitrogen atom and one further nitrogen atom, the said rings otherwise having a hydrocarbon structure, $R_3$ denotes a member selected from the group consisting of hydrogen, alkyl and $-N(R_2)_2$, and $R_1$ and $R_3$ together with the radical $-CO-NR_2-$ represent members of a ring having 5 to 7 members and having hydrocarbon structure apart from the grouping $$-CO-NR_2-$$

2. A process according to claim 1 wherein the carboxylic amide is used in a concentration of 0.1 to 5% by weight with reference to the carboxylic acid to be esterified.

3. A process as claimed in claim 1 carried out at a temperature between 70° and 120° C.

4. A process as claimed in claim 1 carried out in the presence of a solvent.

References Cited by the Examiner

UNITED STATES PATENTS 2,929,835   3/1960   Hayes 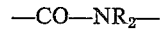 260—148.6

LORRAINE A. WEINBERGER, *Primary Examiner.*

LEON ZITVER, *Examiner.*

D. P. CLARKE, A. P. HALLUIN, *Assistant Examiners.*